(12) United States Patent
Inglis

(10) Patent No.: US 7,368,160 B2
(45) Date of Patent: May 6, 2008

(54) PACKAGING FILM

(75) Inventor: Thomas Inglis, Wingham (CA)

(73) Assignee: Biax International Inc., Wingham, Ontario (CA)

( * ) Notice: Subject to any disclaimer, the term of this patent is extended or adjusted under 35 U.S.C. 154(b) by 0 days.

(21) Appl. No.: 11/142,296

(22) Filed: Jun. 2, 2005

(65) Prior Publication Data

US 2005/0287358 A1   Dec. 29, 2005

(30) Foreign Application Priority Data

Jun. 23, 2004   (CA) ................................ 2,472,420

(51) Int. Cl.
  *B32B 7/02*   (2006.01)
  *B32B 15/09*   (2006.01)
  *B32B 27/08*   (2006.01)
  *B32B 27/20*   (2006.01)
  *B32B 27/36*   (2006.01)

(52) U.S. Cl. ................ 428/212; 428/304.4; 428/314.4; 428/315.5; 428/317.9; 428/319.3; 428/319.7; 428/323; 428/327; 428/458; 428/480; 428/910

(58) Field of Classification Search ..................... None
See application file for complete search history.

(56) References Cited

U.S. PATENT DOCUMENTS

| | | | | |
|---|---|---|---|---|
| 4,568,616 | A * | 2/1986 | Seifried et al. ............. | 428/480 |
| 5,372,879 | A * | 12/1994 | Handa et al. ................ | 428/327 |
| 5,556,711 | A * | 9/1996 | Ajioka et al. ............... | 428/460 |
| 5,756,651 | A * | 5/1998 | Chen et al. .................. | 528/354 |
| 5,849,401 | A * | 12/1998 | El-Afandi et al. .......... | 428/215 |
| 5,908,918 | A * | 6/1999 | Chen et al. .................. | 528/354 |
| 5,932,341 | A * | 8/1999 | Endo et al. .................. | 428/327 |
| 6,136,905 | A * | 10/2000 | Suzuki et al. ................ | 524/310 |
| 6,153,276 | A * | 11/2000 | Oya et al. ................... | 428/35.2 |
| 6,207,792 | B1 * | 3/2001 | Gruber et al. .............. | 528/354 |
| 6,312,823 | B1 * | 11/2001 | El-Afandi et al. .......... | 428/480 |
| 6,323,308 | B1 * | 11/2001 | Kobayashi et al. ......... | 528/354 |
| 6,326,440 | B1 * | 12/2001 | Terada et al. ............... | 525/411 |
| 6,815,079 | B2 * | 11/2004 | Rosenbaum et al. ........ | 428/480 |
| 6,844,077 | B2 * | 1/2005 | Squier et al. ................ | 428/457 |
| 2003/0039775 | A1 * | 2/2003 | Kong ......................... | 428/34.9 |
| 2004/0151934 | A1 * | 8/2004 | Schwark et al. ............ | 428/518 |
| 2004/0161622 | A1 * | 8/2004 | Rosenbaum et al. ........ | 428/480 |
| 2005/0008815 | A1 * | 1/2005 | Sukigara et al. ............. | 428/98 |
| 2006/0269710 | A1 * | 11/2006 | Inglis ......................... | 428/35.7 |

FOREIGN PATENT DOCUMENTS

| JP | 2003-170560 | * | 6/2003 |
|---|---|---|---|
| JP | 2004-090522 | * | 3/2004 |

OTHER PUBLICATIONS

Schimtz, Peter et al., "Films." Ullmann's Encyclopedia of Industrial Chemistry, 5th Ed., vol. A11 (1988), pp.85-95, 105-06, 108-110.*

* cited by examiner

*Primary Examiner*—Vivian Chen

(57) ABSTRACT

A film of biodegradable polylactic acid polymers and copolymers is produced by coextrusion which displays improved winding and manufacturability and end use performance. The film is coextruded from polylactic acid (PLA) polymers and copolymers and biaxially oriented. The surface layer(s) of the film is modified with a particle and displays improved COF, blocking resistance, reduced static generation, improved winding and improved package formation on packaging machines.

16 Claims, No Drawings

PACKAGING FILM

FIELD OF THE INVENTION

This invention relates to the production and use of oriented multilayered polylactic acid films for use as a unsupported or laminated packaging film in food and industrial packaging applications. In particular it relates to biodegradable biaxially oriented films with improved coefficient of friction and reduced blocking and static generation and showing significantly improved winding, slitting, vacuum metallizing and packaging machine operation and a dramatic reduction in static generation.

DESCRIPTION OF THE RELATED ART

Polylactic acid is a biodegradable or compostable polymer produced from the condensation polymerization of lactic acid. The monomer used for the production of polylactic acid is available in two optically active isomers, the D-Lactic acid and the L-lactic acid. The relative amounts of the two isomers when combined together and polymerized yield various polymers with different crystallinity (amorphous to semicryatalline), crystallization behavior and melting points. Polymers of this type are available from Cargill-Dow and are represented by the commercial polymer grades, PLA4042™ and PLA4060™. Both resins are produced by the combination of the two optical isomers of lactic acid, the L-lactic acid and the D-lactic acid in different ratios. The relative ratio of the two isomers controls the final crystallinity and crystallization behavior of the polymers as well as varying physical and thermal properties.

When the commercially available polylactic acid polymers (PLA) are coextruded and biaxially stretched, the films produced have excellent clarity and gloss but demonstrate poor surface slip properties as defined by the coefficient of friction (COF) and poor film roll formation and as a result are prone to scratching when processed or passed over stationary equipment parts as found on packaging machines. In addition, excessive forces are required to pull film products through the packaging machines, leading to film breakage, wrinkles and creases. The films produced from the unmodified PLA also show a pronounced tendency to block in roll form, especially when surface treated such as by corona, flame or plasma treatment methods common in the film industry. Aside from the blocking, the formation of well formed rolls both in winding on the orienter and in rewinding and slitting is very difficult. This tendency towards poor roll formation and blocking leads to excessive film loss and poor manufacturing efficiencies. It has therefore been found necessary to slip modify the PLA films produced from commercially available resins.

Polylactic acid polymers have been produced as single layer biaxially oriented films as described in U.S. Pat. No. 6,713,174 for the production of a heat tackable and heat-stickable single layer film. While the examples show the addition of a 2.5 micron silica to the polymer, it is silent on the need to formulate the films for improved performance when used as intended here. Also the disclosure is silent on the use of multilayer films to improve performance while improving the economics of the biaxially oriented film produced.

The use of antiblock particles to improve film performance is widely known and, in the case of single layer films, the incorporation of additives must be through the entire thickness of the polymer. This has several disadvantages in that the antiblock particles are surface agents designed to control the contact area of two adjacent film layers or between the film surface and adjacent surfaces, such as metal or rubber covered rollers on processing equipment. Therefore the benefit of a large portion of the particles are lost due to their incorporation in the inside of the film away from the surface. Therefore larger quantities of antiblocking particles must be used than are required for the improvement in surface properties. This results in an increased cost for the antiblock particles and will limit the use of expensive, but highly effective additives, such as the spherical crosslinked silicones such as Tospearl™ or crosslinked acrylic spheres such as Epostar™. In addition the use of additional non functional particles in the core will increase the amount of light scattering as measured by the film haze and reduce the value and aesthetic appeal of the film as it impacts the ability to display the packaged product.

U.S. Pat. No. 6,649,732 B2 discloses a clear high barrier ceramic coated biaxially oriented polylactic acid film produced from 100% poly-L-lactic acid produced from the polymerization of L-lactic acid. The films may contain antiblock particles with the limitation that the ceramic coated surface must have a reduced loading of particles and no projections higher than 1.89 micrometers on at least the deposition surface. The film also requires the addition of antistatic additives such as anionic and cationic surfactants as well as nonionic surfactants to reduce the static in the film. U.S. Pat. No. 6,649,732 is silent on the impact of antiblocking particles on the static generation properties of the films and is focused on the improvement on clear barrier properties when coated with ceramic barrier layers. The patent also does not discuss the addition of antiblock particles to coextruded layers and recommends the addition of antiblocking particles to the lactic acid monomer prior to polymerization to insure good dispersion. The U.S. Pat. No. 6,649,732 patent states that polylactic acid films may be coextruded with a second resin but the patent is silent as to the nature of the second resin and does not indicate its modification to improve film handling.

The heat sealability of the multilayer film of U.S. Pat. No. 6,647,732 is controlled by the addition of a polyolefin layer such as polypropylene or polyethylene which may also require the addition of an adhesion promoting layer to be added to the film surface prior to the addition of the heat sealing layer. The adhesion promoting layer is a layer added to the film surface by a coating method and may be polyester, and acrylic resin, polyurethane or a copolymer of two or more of the materials. Alternatively the heat sealing layer of polyolefin can be added to the film by a dry or extrusion lamination process using a suitable adhesive layer.

U.S. Pat. No. 6,703,115 discloses a multilayer film with a polylactic acid core of from 70 to 100% and from 0 to 30% of filler and a second layer comprising from 20 to 80% of one or more thermoplastic polymer and from 80-20% of an inorganic filler which when stretched has a WVTR greater than that of the thermoplastic materials of the second layer. The films of the current invention are unfilled in both the core and skins.

SUMMARY OF THE INVENTION

The present invention is related to the production of multilayer coextruded films comprised of biodegradable polylactic acid copolymers with improved handling and web processing while adding the additional benefit of reduced COF (coefficient of friction), reduced blocking, the addition of heat sealability, improved printing, improved adhesion of metallized layers and a surprising reduction in the static formation and reduction in dust pick up by the films. It has been discovered that the addition of small amounts of spherical crosslinked polymer based particles to thin surface layers of a coextruded PLA film impart exceptional film properties when compared not only to the unmodified film but also unexpectedly when compared to films modified with antiblocking particles such as silica well known to those skilled in the art.

In one aspect of the invention the addition of 0.05% to 0.6% by weight of the spherical particles having a particle size of from 2 to 6 microns to the skin resin significantly reduced the film COF. In addition to this lowering of the COF, the film retained an excellent clarity (reduced haze) in comparison to other antiblock particles such as silica which gave a marked increase in film haze. In addition the COF was at its final value as the film was produced as opposed to films using other slip technologies which are dependent on the diffusion of low molecular weight materials to the film surface.

In another aspect of the invention, the spherical polymer based particles are selected from polymethylsilsesquioxane and acrylic resin.

DESCRIPTION OF THE INVENTION

The present invention is directed to a coextruded, biodegradable film comprising a core layer of polylactic acid copolymer and at least one additional layer and as many as four additional layers of polylactic acid copolymer of the same or lower melting point from that of the core and ideally three layers. To at least one of the outermost skin layers a spherical particle produced from crosslinked polymer preferably selected from polymethylsilsesquioxane and acrylic resin, most preferably polymethylsilsesquioxane with a particle size ranging from 2 to 6 microns in diameter is added in an amount ranging form 0.05% to 0.6% by weight of the skin layer, preferably a particle size ranging from 2.0 to 4.5 microns is added in an amount of from 0.1 to 0.3% by weight of the skin layer. The relative thicknesses of the core and surface layers are chosen such that the final surface skin layer thickness after stretching may vary from 0.5 to 3 microns and preferably from 0.8 to 1.8 microns regardless of the final film thickness.

The multilayer film may be produced by sequential or simultaneous orientation with a tenter frame process common to the industry and well known in the art. In the particular case of a sequential orientation the following steps are outlined.

The individual layers of the film are produced by melting the polymers individually in separate extruders, adding the particles to the polymer feed to the extruder, and mixing and dispersing in the polymer during the melting of the polymer. The individual layers are filtered to insure melt cleanliness without removing the added particles and combined in a multicavity die. It should be understood by those skilled in the art that the multilayer melt combination can also be done with a coextrusion feedblock or combined in a coextrusion feedblock and a multicavity die in combination. As the multilayer melt is extruded from the die, it is forced against a chilled chromed casting roll with the use of a pinning mechanism well known in the art, such as electrostatic pinning, an air knife, a vacuum box, an additional nip cooling roll or a combination of methods, such as an air knife and electrostatic edge pinning. The cast film is cooled by the casting roll to set the molecular structure of the skin and core for subsequent orientation. On removal from the casting section, the cast sheet is transported to the machine direction orienter at a uniform speed where it is contacted with a series of heated rolls and reheated to the drawing temperature. The heated sheet is then passed between two rolls, the second of which is driven at a speed higher than the first, to stretch the film in the axial or machine direction (MD). This machine direction stretching speed ratio (MDX) may range from 2 to 6 times, preferably from 2.5 to 4 times. The MD stretched film is then cooled after stretching on additional heat transfer rolls and transferred to a tenter for transverse (TD) orientation. This TD orientation is accomplished by stretching in a heated oven consisting of preheat, stretching and annealing sections. The stretching is performed between two continuous rails in which travel a continuous chain with clips designed for gripping the edges of the MD stretched sheet. In the preheat section the rails are approximately parallel and at the approximate width of the MD stretched sheet. The rails then diverge forcing the chains apart and stretching the film restrained in the clips. This TD stretching can be from 2 times to 6 times the initial width of the chain separation and preferably from 2.5 to 4 times. The rails are then made parallel at the end of the stretching section at the final width and the film is heated at temperature suitable for crystallizing and annealing the film while restrained in the clips. This crystallization and annealing will reduce the shrinkage of the film when reheated and the conditions chosen to give the desired shrinkage of the film in subsequent converting operations. If desired, the chain separation may be reduced slightly to improve the dimensional stability of the film as is well known in the art. The rails then exit the oven and the film is quenched in air before being released from the clips. Upon release, the stretched film is passed to a thickness scanning station to measure the thickness uniformity of the film. Die adjustments, either in a manual or automatic mode, may be made to improve the uniformity of the thickness as required or desired. The stretched film then has its edges slit off to remove the remaining thick regions where it was held by the clips and the trim is then ground for reuse. If desired, the ground trim may be added directly back into the film making process or pelletized in a separate operation and added back into the film making process or resold for other purposes. The film is then passed thru a web handling system and may be subjected to a surface treatment step on one or both sides and is then wound up on master or mill rolls for subsequent slitting and converting processes.

The films produced show excellent haze and gloss values and display a low and uniform COF off the line and do not require additional time or temperature to reduce the COF. In addition, the static generation is notably reduced at the winding operation and in subsequent handling compound to films produced with other antiblock particles and displays a reduced static generation and dust pick up when rubbed over a cloth surface and held over a container of loose light weight particles such as cigarette ash.

It should be obvious that the slip modification technology can be applied to films with additional intermediate layers, clear or pigmented, between the core and the surface layers. If desired the core layer may be blended with incompatible materials such as calcium carbonate or other PLA incompatible polymers which disperse in the PLA and create void initiating particles to give a cavitated core on stretching to give an opaque film.

The following examples are included to illustrate preferred embodiments of the invention and are not intended to limit in any way the scope of the invention.

EXAMPLE 1

A three layer film was produced by individually extruding a major or inner layer (core) of PLA4042™ and onto this core extruding two additional surface layers of PLA4042™ each containing 0.2% by weight of the skin layer of a spherical particle produced from crosslinked polymethyl-silsesquioxane. The average particle size was 2.0 micrometers (Tospearl™ 120A) and the final skin thickness after stretching was from 0.8 to 1.4 microns. The three polymer flows were combined in a three cavity die and cast onto a cooled chill roll. The sheet so produced was transferred to a machine direction orienter (MDO) and reheated on hot rollers set at from 55°-70° C. and ideally at 60°-62° C. The sheet was then stretched between two rollers driven at different speeds with a speed increase of approximately 3 times between the first and second rolls. The drawn sheet was then passed over a series of cooling rollers and transferred to a tenter frame for transverse stretching where it was introduced into a set of clips located on parallel chains traveling at a uniform speed with a uniform spacing and preheated in a forced air oven at a temperature of 50°-65° C. Next the film was stretched 3 times in the transverse (TD) direction by a divergence of the chains in the oven at a temperature of 65°-75° C. and then annealed and crystallized in a section of parallel or slightly converging chain separation at approximately 135° to 145° C. and preferable at 141° C. to heat set the film and increase it crystallinity and reduce its tendency to shrink on reheating. Next the film was released for the clips and transferred to a film gauging system to determine its thickness uniformity and then the thickened edges remaining for the clips were slit and removed. The film next passed through a surface treatment station and was treated to a desired level to improve film processing and conversion and wound into master rolls for subsequent slitting operations. The film produced showed excellent handling and winding properties while maintaining an excellent optical clarity and a surprisingly low tendency towards static generation and dust pick up. The film also has displayed good hot slip and printability.

EXAMPLE 2

The film was prepared as in example 1 with the exception that the antiblock particle was comprised of from 0.05-2.5% by weight of the skin layer of a silica particle of 4-5 micron average particle size. The films so produced displayed improved handling and blocking resistance but displayed a poor clarity evidenced by a high and objectionable haze level. There was no improvement in reducing static generation and in reduced dust pick up.

EXAMPLE 3

The film was produced as in example 1 where both surface layers were comprised of a heat sealable PLA 4060 copolymer and containing 0.2% by weight of the skin layer of a spherical particle produced from crosslinked polymethylsilsesquioxane. The film so produced exhibited improved heat sealing and displayed excellent handling and winding properties while maintaining an excellent optical clarity and a surprisingly low tendency towards static generation and dust pick up.

EXAMPLE 4

A base sheet for metallization was produced as in example 1 where both surface layers were comprised of a heat sealable PLA 4060 copolymer and with only one surface containing 0.2% by weight of the skin layer of a spherical particle produced from crosslinked polymethylsilsesquioxane. The second skin layer was comprised of neat PLA4060™ (no spherical particles) and was corona treated. The film so produced exhibited improved heat sealing and displayed excellent handling and winding properties while maintaining an excellent optical clarity and a surprisingly low tendency towards static generation and dust pick up.

EXAMPLE 5

The film of example 3 which was extrusion laminated to a second outer printed polymer web useful for the production of a plastic bag on a vertical form fill and seal machine. The lamination showed improved performance on the packaging machine giving good bag formation and exhibiting low transport forces relative to a film produced in lamination with the unmodified surface layers film and the film of example 2.

The present invention provides a biodegradable biaxially oriented films with improved coefficient of friction and reduced blocking and static generation and showing significantly improved winding, slitting, vacuum metallizing and packaging machine operation and a dramatic reduction in static generation. The film of the present invention also has an improved hot slip property.

The present invention overcomes the defects of the prior art by the production of multilayer films where the surface active antiblock particles can be added to the surface layers which place the particles where they are most useful, while reducing significantly the amount of additive required, lowering the cost of the film. In addition the total haze of the film may be significantly reduced due to the lower light scattering induced by the absence of scattering particles from the core.

The particle addition resulted in a significant reduction in the blocking tendency of the film and improved the manufacturability of the product by reducing scrap in manufacturing.

The addition of the spherical particles in the skin create local variations in the surface roughness of the film which tends to trap an air layer of a specific thickness when the film is in contact with a surface such as a roll or when wound on itself in manufacturing. This controlled air layer appears to be maintaining the films surfaces away from the surface with which it is in contact which improves the formation of wound and slit rolls of film and aids in the reduction of film to film contact adhesion which results in film blocking. This is apparent when low melting PLA resins are used on the film surface to add improved printing and when these film surface layers are treated to improve wetability and adhesion in subsequent converting processes.

The addition of the particles to only one surface was sufficient to impart the benefits while permitting the use of a particle free surface to improve the metallizing aspect of the film.

In the current invention it has been discovered that the addition of spherical crosslinked polymer based particles such as polymethylsilsesquioxane based particles (Tospearl™) significantly improves the handling properties of the film and significantly reduces the static properties of the film resulting in lower dust pick up than films with silica or other antiblocking particles.

In the present invention the addition of the particles to the molten polymer is accomplished by direct addition to the extruder followed by the normal extrusion melting of the PLA and mixing and dispersion of the particles directly in the high viscosity molten PLAX. The particles were mixed with solid polymer pellets as received with a small portion of compatible oil and physically blended with the polymer pellets which were used as mixed or alternatively let down and mixed with additional polymer. This level of mixing and dispersion has been found to be sufficient for dispersing the particles as opposed to the teaching of the U.S. Pat. No. 6,649,732 patent.

In the current invention sealability is added to the film by the coextrusion of a heat sealable polylactic acid layer and the adhesion of the sealing layer is excellent and does not require the addition of an adhesion promoting layer.

Various modifications to the process and film construction will be apparent to and can be readily made by those skilled in the art without departing from the scope and spirit of this invention. Accordingly, it is not intended the scope of the claims appended hereto be limited to the description as set forth herein, but rather that the claims be broadly construed.

What is claimed is:

1. An oriented multi layer coextruded polylactic acid film comprising, an inner layer consisting of polylactic acid with two surfaces, and attached to at least one of said inner layer surfaces, at least one additional skin layer of the same or different polylactic acid resins as the inner layer and containing 0.05% to 0.6% by weight of spherical particles of a cross-linked polymer having a particle size of from 2 to 6 microns for the purpose of reducing the coefficient of friction (COF) and static generation of the composite film, the skin layer being attached to the core at an inner surface of the skin layer.

2. The film according to claim 1 wherein the polylactic acid skin layers are of the same polymer as the inner layer.

3. The film according to claim 1 wherein the polymer of the skin layers are of a lower melting polylactic acid composition than the polymer of the inner layer.

4. The film according to claim 1 wherein the polymer of the skin layers are of a lower crystallinity than the polymer of the inner layer.

5. The film according to claim 4 wherein a skin layer is attached to each of the inner layer surfaces, and only one skin layer contains the spherical particles.

6. The film according to claim 5 wherein the film surface opposite the skin layer containing the spherical particles is vacuum metallized with a deposited metal.

7. The film according to claim 6 wherein the vacuum deposited metal is aluminum.

8. The film according to claim 1 wherein one skin layer is of a different polylactic acid composition.

9. The film according to claim 1 wherein the spherical particles are a crosslinked polymethylsilsesquioxane.

10. The film according to claim 1 wherein the spherical particles are a crosslinked acrylic resin.

11. The film according to claim 1 wherein the spherical particles are present in a range of from 0.01% to 0.5% by weight of the skin layer polymer.

12. The film according to claim 1 wherein one or both surfaces of the film are subjected to corona, flame or plasma treatment.

13. The film according to claim 1 wherein the inner layer is blended with a cavitating agent selected from an incompatible polymer or inorganic particle in the range of 0.1 to 4.0 microns which on stretching forms a series of micro voids each containing at least one void initiating particle.

14. The film according to claim 13 comprising at least one additional intermediate polymeric layer located between the inner layer surfaces and the inner surface of the attached skin layer.

15. The film according to claim 14 wherein the intermediate layer is pigmented.

16. The film according to claim 15 wherein the pigment is $TiO_2$.

* * * * *